July 30, 1946.   L. H. ENOS   2,405,022
PROPELLER BLADE
Filed Aug. 21, 1943
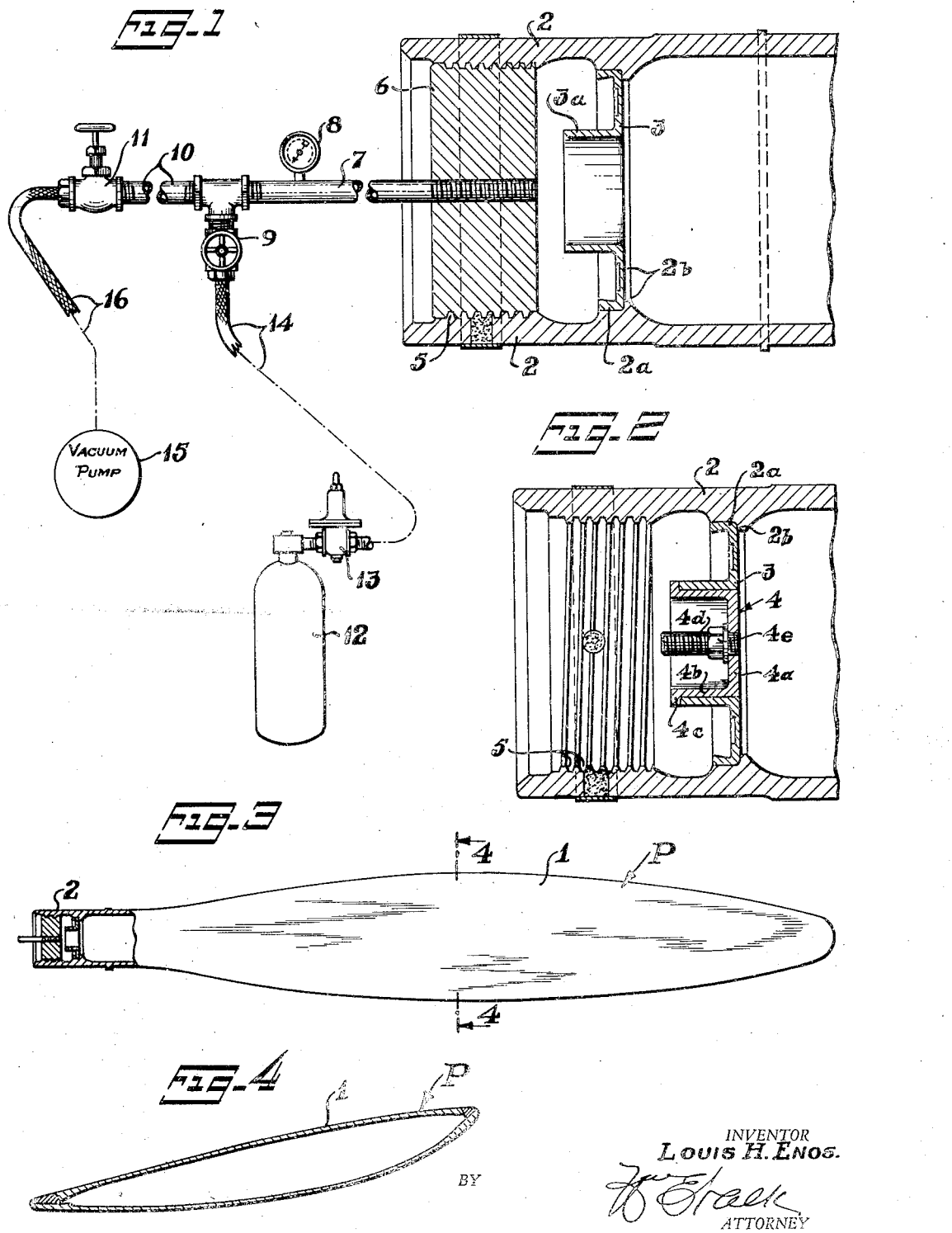
INVENTOR
LOUIS H. ENOS.
ATTORNEY Patented July 30, 1946

2,405,022

UNITED STATES PATENT OFFICE 2,405,022

PROPELLER BLADE

Louis H. Enos, Montclair, N. J., assignor to Curtiss-Wright Corporation, a corporation of Delaware Application August 21, 1943, Serial No. 499,744

4 Claims. (Cl. 170—159)

My invention relates to a propeller blade.

In accordance with my invention, a sealed chamber formed by the facing plates of a propeller blade contains a desired quantity of a gas having specific gravity substantially less than that of air.

Various other objects and characteristics of my invention will become apparent from the following detailed description.

My invention resides in the novel propeller blade, sealed gas-containing propeller blade, features and arrangements of the character hereinafter described and claimed.

For an understanding of my invention and for an illustration of one of the forms thereof, reference is to be had to the accompanying drawing, in which:

Fig. 1 is a sectional view showing the shank end of a propeller blade and an associated system for withdrawing gas therefrom and supplying gas thereto;

Fig. 2 is a sectional view showing the shank end of a sealed propeller blade;

Fig. 3 is a plan view showing the propeller blade of my invention; and

Fig. 4 is a vertical sectional view taken on the line 4—4 of Fig. 3 looking in the direction of the arrows.

Hollow steel propeller blades for aircraft are so constructed that each propeller blade defines a sealed chamber filled with air having pressure the same or approximately the same as that of the atmosphere. When such propeller blades are rotated at high speed, the air in each blade, by centrifugal action, is concentrated under greatly increased pressure in the tip area of the blade. This often causes change in the airfoil section of the blade, and, as will be obvious, such change is undesirable. This disadvantage of the prior art, by my invention, is overcome by substituting, for a large quantity of the air which normally is contained in the sealed blade chamber, a gas having specific gravity substantially less than that of the air.

Referring to the drawing, P represents a propeller blade of known construction which defines an interior sealed chamber. As herein shown, the blade P is formed from two plates 1, 1 secured together by welded joints at the leading and trailing edges, one of the plates 1 merging into a tubular shank 2 which comprises an interior circular seat 2a terminating in a circular flange 2b. The seat 2a receives a balance disk 3 having a circular tubular extension 3a, said disk 3 being held and sealed in its seat 2a in any suitable manner as known in the art. As shown in Fig. 2, the tubular extension 3a of the disk 3, in sealed relation, is adapted to receive a balance plug 4 which comprises a base 4a, a tubular section 4b terminating in a flange 4c, and a threaded spindle 4d on which a nut 4e is threaded. At its end toward the left, Fig. 1, the shank 2 is interiorly threaded as at 5 for the reception of the usual gear for attachment in the propeller hub.

In accordance with the invention, the balance plug 4 is withdrawn in the conventional manner to thereby provide an open passage leading to the interior of the blade P, Fig. 1. Thereupon, an exteriorly threaded plate 6 is threaded into the end of the shank 2, a suitable sealing medium being utilized for sealing the joint between said shank 2 and the plate 6, the latter, then, sealing the interior chamber of the blade P.

Extending through the plate 6 and communicating with the sealed chamber of the blade P is a pipe 7 carrying a gauge 8 and terminating at one end in a T-fitting to which is secured a valve 9 and a nipple 10, the later having a valve 11 secured thereto. A tank 12 containing a gas, such as helium or hydrogen, having specific gravity substantially less than that of air and carrying a pressure reducing valve 13 is connected by a flexible tube 14 to the aforesaid valve 9 and a suitable vacuum pump 15 is connected by a flexible tube 16 to the aforesaid valve 11.

With a system of the character described above, the operator alternately operates the valves 11 and 9 to withdraw gas from the sealed chamber defined by the propeller blade and to force low specific gravity gas under pressure into said sealed chamber from the tank 12. More specifically, the first step of operation involves opening of the valve 11 to connect the vacuum pump to said sealed chamber, the vacuum pump 15 remaining connected in this manner until the pressure in the sealed chamber is reduced to approximately half that of the atmosphere. Thereupon, the valve 11 is closed and the valve 9 is opened whereupon low specific gravity gas from the tank 12, the pressure thereof being suitably reduced by the pressure-reducing valve 13, flows from said tank 12 into said sealed chamber, this action continuing until the pressure in the latter is restored to approximately atmospheric pressure. The cycle thus described should be repeated three times more or less whereupon the mixture in said sealed chamber is approximately at atmospheric pressure and comprises about ⅛ air and ⅞ low specific gravity gas from the tank 12 although, as will be understood, this proportion of air and low specific gravity gas may be different to such extent as may be desirable. After completion of the foregoing, the balance plug 4, freshly tinned and mounted on its driving rod, is held ready by one operator while the plate 6 is unthreaded from the shank 2. Preferably, at this time, the tip end of the blade is held in elevated position a distance of eighteen inches more or less, and, immediately, upon detachment of said plate 6, the balance plug 4 is disposed in position as shown in Fig. 2 and soldered in place to thereby permanently seal the gas-containing chamber formed by the propeller plates 1, 1.

Sealed propeller blades having therein a low specific gravity gas as described above, when rotated at high speed, are free from the objectionable development of high pressure (as caused by air) in the tip areas of the respective blades. Accordingly, deformation of the airfoil sections of the respective propeller blades is prevented or greatly reduced. At the same time, the pressure developed by the low specific gravity gas is sufficient to prevent undesirable buckling action of the blades while they are stationary.

Preferably, helium is the low specific gravity gas which is used in accordance with the invention. Hydrogen is satisfactory but, due to the explosion hazard, the use thereof is not desirable.

It shall be understood that my invention is applicable to various forms or types of hollow propeller blades. Thus, the invention is not to be restricted to a propeller blade formed from two plates and neither is the invention to be restricted to any particular type of permanent blade-sealing arrangement.

It shall also be understood that the invention is not to be limited to the disclosed system for withdrawing gas from and introducing gas into the sealed chamber of the propeller blade. Obviously, any suitable system may be utilized for this purpose.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A hollow metallic propeller blade comprising a shank portion having extending therefrom plates disposed in facing relation and forming an interior chamber, and a detachable member in said shank portion sealing said chamber, said chamber containing a gas at approximately atmospheric pressure having a specific gravity substantially less than that of air.

2. As a new article of manufacture, a hollow metallic propeller blade comprising a shank portion having extending therefrom plates disposed in facing relation and forming an interior chamber, and a detachable member in said shank portion sealing said chamber, said sealed chamber containing a gaseous mixture comprising substantially one part air to seven parts helium at approximately atmospheric pressure.

3. A propeller blade comprising a shank having extending therefrom metallic plates permanently shaped to define an airfoil section, said plates being disposed in facing relation and forming a sealed chamber containing principally a gas at approximately atmospheric pressure and having specific gravity substantially less than that of air, said gas, when the propeller blade is rotated at high speed, developing pressure insufficient to deform said airfoil section to any substantial extent, said gas, by reason of the specified pressure thereof, serving to prevent buckling of the blade while the latter is stationary.

4. A propeller blade comprising a shank having extending therefrom metallic plates permanently shaped to define an airfoil section, said plates being disposed in facing relation and forming a sealed chamber containing a gaseous mixture having a specific gravity substantially less than that of air and comprising approximately one part air to seven parts helium at substantially atmospheric pressure, said gaseous mixture, when the propeller blade is rotated at high speed, developing pressure insufficient to deform said airfoil section to any substantial extent, said gaseous mixture, by reason of the specified pressure thereof, serving to prevent buckling of the blade while the latter is stationary.

LOUIS H. ENOS.